United States Patent [19]

Coltrin et al.

[11] 3,973,745
[45] Aug. 10, 1976

[54] SOLAR CELL ARRANGEMENT FOR A SPIN STABILIZED VEHICLE

[75] Inventors: Robert E. Coltrin, Manhattan Beach; Thomas C. Eakins, Rancho Palos Verdes; John E. McIntyre, Los Alamitos, all of Calif.

[73] Assignee: Hughes Aircraft Company, Culver City, Calif.

[22] Filed: Oct. 30, 1974

[21] Appl. No.: 519,387

[52] U.S. Cl. ................................. 244/173; 136/89
[51] Int. Cl.² ........................................ B64G 1/10
[58] Field of Search ............. 244/173, 158; 136/89; 52/108, 71

[56] References Cited
UNITED STATES PATENTS

| | | | |
|---|---|---|---|
| 3,525,483 | 8/1970 | Van Alstyne | 244/173 |
| 3,627,585 | 12/1971 | Dollery et al. | 244/173 X |
| 3,677,508 | 7/1972 | Dillard et al. | 244/173 |
| 3,722,840 | 3/1973 | Andrews et al. | 244/173 |
| 3,733,758 | 5/1973 | Maier et al. | 244/173 X |
| 3,845,921 | 11/1974 | Thompson et al. | 244/158 |

*Primary Examiner*—Trygve M. Blix
*Assistant Examiner*—Barry L. Kelmachter
*Attorney, Agent, or Firm*—William L. Androlia; W. H. MacAllister

[57] ABSTRACT

A spin-stabilized vehicle comprising a body and three deployable panels. The inner ends of the panels are attached to the vehicle body at points equidistant from each other. Furthermore, the panel surfaces are covered with photovoltaic or solar cells. During transport and ascent of the vehicle, the panels are stowed in packages supported on the body of the vehicle. The packages are controllably deployed radially of the body in the presence of centrifugal force which in effect removes the panels from the packages. When deployed, the panels extend radially from the body of the vehicle. The use of three panels results in a relatively small ripple of the power supplied by the cells as the vehicle rotates thereby providing a relatively high efficiency of cell utilization. In addition, the utilization of panels which radiate radially from the body of the vehicle with storage boxes at the outer panel ends increases the spin moment of inertia improving the stability of the vehicle.

4 Claims, 5 Drawing Figures

SOLAR CELL ARRANGEMENT FOR A SPIN STABILIZED VEHICLE

FIELD OF THE INVENTION

The present invention relates to vehicles employable in space and more particularly to vehicles useful in communication systems in which large power requirements are furnished by self-carried solar energy conversion means.

DESCRIPTION OF THE PRIOR ART

Spacecraft, employed in communications systems, require extensive power plants for powering the various control subsystems such as those used for attitude control as well as supplying the needs of the overall communications system components. Such spacecraft have long employed solar cells in various types of arrays for converting solar energy directly into electrical form. Obviously, the outer surfaces of the spacecraft may be readily covered with solar cells in a rigid manner, but the power converted is then limited by the area of the spacecraft outer surfaces. To increase the available power without substantially increasing the size of the spacecraft itself, there have been attempts to deploy various rigid and flexible arrays of solar cells from the main spacecraft body subsequent to orbit and attitude orientation, such that the surface area of the solar cell array, when deployed, is much greater than the surface area of the spacecraft during launch.

Rigid type solar cell arrays, even though deployed from the spacecraft proper subsequent to achievement of orbit and attitude orientation, are still very fragile. Rigid, deployable arrays are stored externally to the spacecraft and therefore are highly susceptible to damage during shipping and ascent into orbit. Furthermore, rigid deployable arrays are heavy and cumbersome. In addition, rigid deployable arrays require expensive and somewhat complex deployment mechanisms. In addition, since rigid arrays are deployed in discrete sections, dynamic balancing problems may exist during deployment. To overcome the dynamic balancing problem, a complex synchronized deployment mechanism can be utilized.

Employment of a deployable flexible array such as suggested in U.S. Pat. No. 3,544,041, which issued on Dec. 1, 1970, to W. J. Billerbeck, solves the dynamic balancing problem which exists during deployment of the array. However, since such a flexible array is wrapped around the outside of the spacecraft during transit and ascent into orbit, it too is subject to damage. Furthermore, this type of flexible array also requires a rather complex deployment mechanism.

Accordingly, it is a general object of the present invention to provide a spacecraft having a body and solar panels structured to provide compactness prior to and during movements to a utilizable position and to enable deployability of the solar panels in utilizable locations.

It is another object of the present invention to provide a spin-stabilized spacecraft structure having more efficient utilization of solar cells carried thereon and a greater photovoltaic or solar cell carrying surface.

It is yet another object of the present invention to provide a spacecraft having a body and solar panels structured to protect the undeployed solar panels from damage during transit and movement to a utilizable position.

It is still another object of the present invention to provide a spacecraft having a body and solar panels structured to easily deploy the solar panels.

It is a further object of the present invention to provide a spacecraft having a body and solar panels structured to provide deployment of the solar panels without creating dynamic imbalance.

SUMMARY OF THE INVENTION

In keeping with the principles of the present invention, the objects are accomplished with a unique combination of a spinning body and individual deployable packaged folded panel assemblies supported by the body. The inner ends of the folded panels are connected to the body and the packaged assemblies are mounted for movement between a stowed position wherein they are contained flat-folded in the protective packages supported adjacent the body and a deployed position wherein they extend substantially radially outwardly from the body. Controllable means are utilized for deploying the packages from the stowed position to the deployed position at a fixed synchronized rate. During transit and ascent into orbit, the flexible panels are accordion folded within and coupled at thin outer ends to the protective packages. After ascent into orbit and the body is spun, the protective packages are controllably radially deployed from the spinning body by the controllable means and the action of centrifugal forces at a fixed rate. As the protective packages are radially deployed, the flexible panels pay out of the protective packages. The protective packages are radially extended until the panels contained therein are completely deployed. Furthermore, after deployment, the panels are held in tension by the action of the centrifugal forces.

BRIEF DESCRIPTION OF THE DRAWINGS

The above-mentioned and other features and objects of the present invention will become more apparent by reference to the following description taken in conjunction with the accompanying drawings, wherein like reference numerals denote like elements, and in which.

DESCRIPTION OF THE PREFERRED EMBODIMENT

Figure 1:
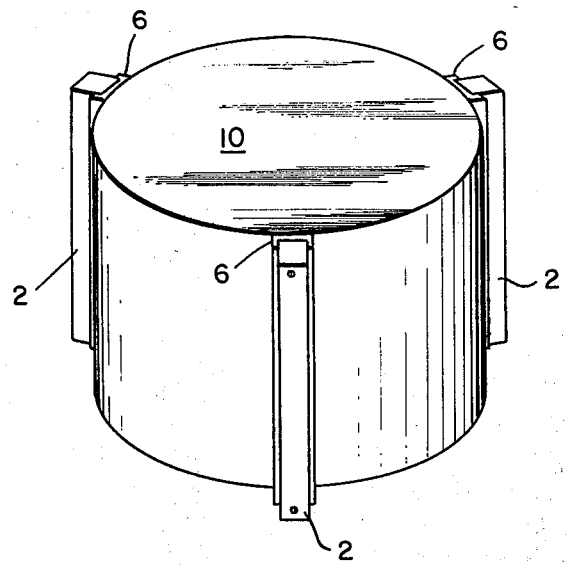
FIG. 1 is a simplified pictorial view of a spacecraft in accordance with the teachings of the present invention with the flexible panels and protective package in the stowed position.
Figure 2:
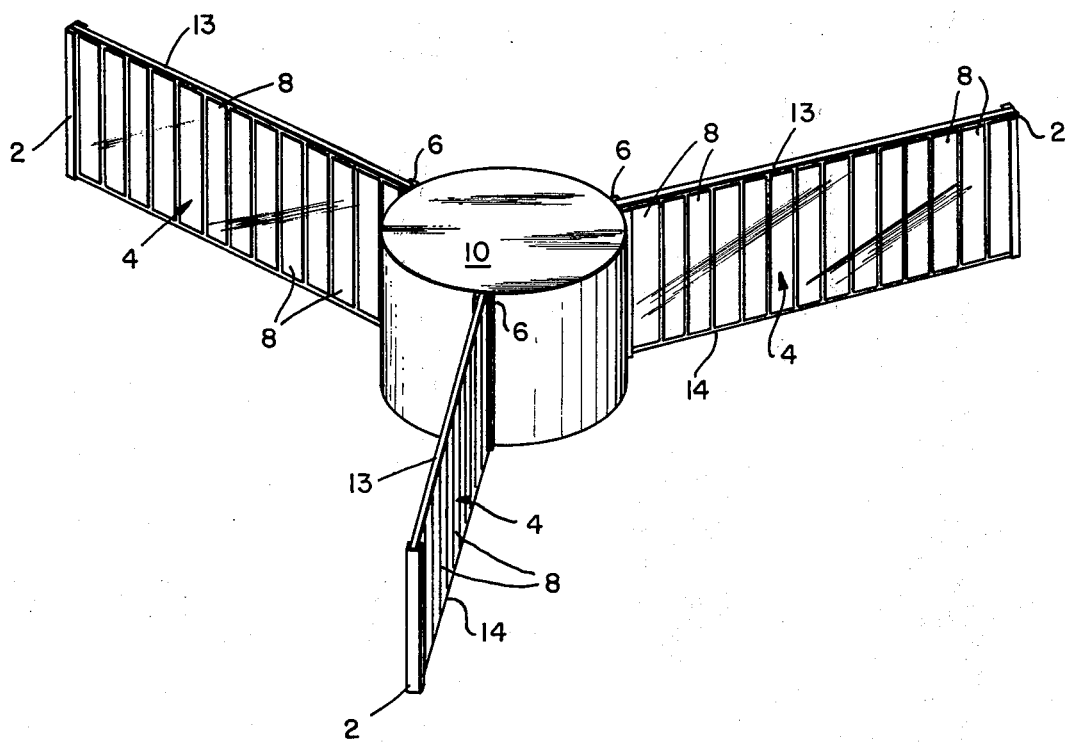
FIG. 2 is a simplified pictorial view of a spacecraft in accordance with the teachings of the present invention with the flexible panels and protective package in the extended or deployed position.

Referring more specifically to the drawings, FIG. 1 and FIG. 2 are simplified pictorial views of a spacecraft in accordance with the teachings of the present invention with the flexible panels and protective packages in the stowed and extended or deployed positions, respectively. FIG. 1 and FIG. 2 are included to facilitate an understanding of the nature and operation of the present invention.

Figure 3:
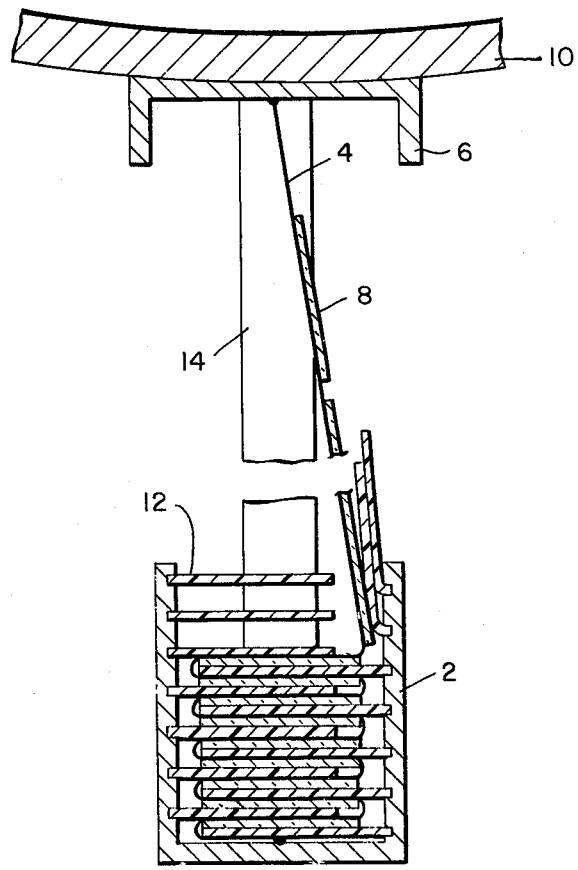
FIG. 3 is an enlarged sectional view of a partially deployed protective package and flexible panel assembly embodying the principles of the present invention.

Referring to FIGS. 1, 2 and 3 and particularly to FIG. 3, the protective package includes an elongated stowage box 2. The two ends of flexible panel 4 are connected respectively to stowage box 2 and stiffening channel 6. Solar cells 8 are mounted on flexible panel 4 and said cells 8 are electrically coupled together to form a solar array. Channel 6 is mounted on body 10 at a point equidistant from other such protective packages. Also, isolators 12 are mounted on alternate sides of stowage box 2. Extendable booms 13 and 14 are coupled respectively between the two ends of stowage box 2 and body 10 as shown in FIG. 2.

In the stowed position, shown in FIG. 1, flexible panel 4 is accordion folded with an isolator 12 between each fold of panel 4, as shown in FIG. 3. When stowed, the complete accordion panel 4 is contained within stowage box 2. In addition, the open end of stowage box 2 is supported on the body by the stiffening channel 6.

In practice, isolators 12 can be made from a soft, thin insulative material such as 0.04 inch thick embossed polyimide film. Furthermore, flexible panel 4 can be made from a continuous sheet of flexible material such as polyimide film and fiberglass laminate with epoxy adhesive or from sections of semi-rigid material which are hinged at the folds. In addition, stowage box 2 may be affixed to stiffening channel 6 by explosive fasteners (not shown) during ascent into orbit.

Figure 4:
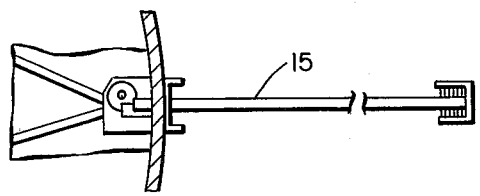
FIG. 4 is a partial sectional view of the spacecraft of FIG. 2 showing some details of a representative deployment mechanism.

In operation, as body 10 rotates about its axis, stowage box 2 tends to move radially outwardly by centrifugal force from the stowed position shown in FIG. 1. As the stowage box 2 moves radially outwardly, the accordion folded panel 4 deploys from stowage box 2. Furthermore, since a restrained rate of deployment is desired to minimize dynamic loading and to avoid damage to the solar cells 8 mounted on panel 4, a restraining means coupled between he stowage box 2 and body 10 is desired. Such a restraining means is the two extendable booms 13 and 14 coupled respectively between the two ends of stowage box 2 and body 10, as shown in FIG. 2. In practice, the booms can be a SPAR Bi-Stem boom 15 as shown in FIG. 4. In addition to restraining the deployment rate, the booms 13 and 14 also add to the stiffness of the extended panels 4.

As stowage box 2 continues to move radially outward under the combined effects of centrifugal force and the control afforded by extending booms 14, flexible panel 4 continues to deploy from stowage box 2. Stowage box 2 radially extends until flexible panel 4 is completely deployed as shown in FIG. 2. Also, during deployment, the undeployed portion of the flexible panel 4 is held substantially within stowage box 2 by centrifugal force thereby overcoming the pop-out problem experienced with other types of flat-pack arrays in zero gravity environment.

Figure 5:
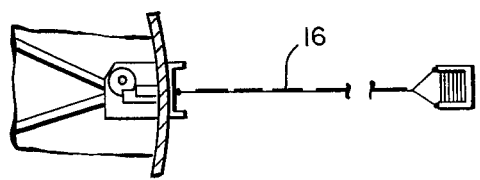
FIG. 5 is a partial sectional view of the spacecraft of FIG. 2 showing some details of another representative deployment mechanism.

Since a major purpose of extendable booms 13 and 14 is to restrain the stowage box 2 during deployment, any device which can perform this restraining function may be substituted for the extendable booms without departing from the spirit of the present invention. Such a device, for example, is the motor-driven wire 16 shown in FIG. 5. Also, a single extendable boom coupled between the center of the stowage box and body 10 may be substituted for the two extendable booms 13 and 14 without departing from the spirit of the invention.

In all cases it is understood that the abovedescribed embodiments are merely illustrative of but a few of many possible embodiments which can represent application of the principles of the present invention. Numerous and varied other arrangements can be readily devised in accordance with these principles by those skilled in the art without departing from the spirit and scope of the invention.

What is claimed is:

1. An apparatus comprising:
   a body intended for spinning;
   at least two stowage boxes supported by said body in corresponding positions adjacent said body, a flexible panel disposed in each of said stowage boxes, each panel being coupled at its inner end to said body and at its outer end to its stowage box;
   means mounting each of said stowage boxes for movement in the presence of centrifugal force from its position adjacent said body to a deployed position radially displaced from said bosy, each of said flexible panels being removed from its stowage box as said stowage boxes move to corresponding deployed positions; and
   means coupled to said body and to said stowage boxes for controlling movement of said stowage boxes from said positions adjacent said body to said deployed positions.

2. An apparatus according to claim 1 wherein said means for controlling the movement of said stowage boxes from said positions adjacent said body to said deployed positions comprises respective controllable extendable booms coupled between said body and each of said stowage boxes.

3. An apparatus according to claim 1 wherein said means for controlling the movement of said stowage boxes from said positions adjacent said body to said deployed positions comprises respective motor-driven wires coupled between said body and each of said stowage boxes.

4. An apparatus according to claim 3 wherein three individual flexible panel and stowage box assemblies are supported in substantially equally spaced circumferential positions by said body.

* * * * *

UNITED STATES PATENT OFFICE
CERTIFICATE OF CORRECTION

PATENT NO. : 3,973,745

DATED : August 10, 1976

INVENTOR(S) : Robert E. Coltrin, Thomas C. Eakins and John E. McIntyre

It is certified that error appears in the above-identified patent and that said Letters Patent are hereby corrected as shown below:

Column 4, line 33, "bosy" should read --body--.

Signed and Sealed this

Twenty-ninth Day of March 1977

[SEAL]

Attest:

RUTH C. MASON
Attesting Officer

C. MARSHALL DANN
Commissioner of Patents and Trademarks